United States Patent
Doggett

(10) Patent No.: US 11,508,143 B2
(45) Date of Patent: Nov. 22, 2022

(54) AUTOMATED SALIENCE ASSESSMENT OF PIXEL ANOMALIES

(71) Applicant: Disney Enterprises, Inc., Burbank, CA (US)

(72) Inventor: Erika Varis Doggett, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 133 days.

(21) Appl. No.: 16/840,201

(22) Filed: Apr. 3, 2020

(65) Prior Publication Data
US 2021/0312213 A1 Oct. 7, 2021

(51) Int. Cl.
*G06V 20/40* (2022.01)
*G06V 10/46* (2022.01)

(52) U.S. Cl.
CPC ............ *G06V 10/462* (2022.01); *G06V 20/46* (2022.01)

(58) Field of Classification Search
None
See application file for complete search history.

(56) References Cited

U.S. PATENT DOCUMENTS

| | | |
|---|---|---|
| 8,013,916 B2 | 9/2011 | Rosen |
| 8,310,570 B1 | 11/2012 | Aldrich |
| 8,970,916 B2 | 3/2015 | Nakamura |
| 9,685,056 B2 | 6/2017 | Klimer |
| 10,083,378 B2 | 9/2018 | Chakraborty |
| 2006/0050158 A1* | 3/2006 | Irie ................ H04N 9/646 348/E9.042 |
| 2006/0177126 A1 | 8/2006 | Han |
| 2008/0118185 A1* | 5/2008 | Jerdev .............. H04N 9/04515 382/300 |
| 2008/0144964 A1* | 6/2008 | Soinio ................ G06T 5/006 382/275 |
| 2008/0284854 A1 | 11/2008 | Thurston, III |

(Continued)

FOREIGN PATENT DOCUMENTS

WO 2018/170393 9/2018

OTHER PUBLICATIONS

U.S. Appl. No. 16/836,453, filed Mar. 31, 2020, and titled "Automated Pixel Error Detection Using an Inpainting Neural Network."

(Continued)

*Primary Examiner* — Idowu O Osifade
(74) *Attorney, Agent, or Firm* — Farjami & Farjami LLP

(57) ABSTRACT

According to one implementation, a system for performing automated salience assessment of pixel anomalies includes a computing platform having a hardware processor and a system memory storing a software code. The hardware processor is configured to execute the software code to analyze an image for a presence of a pixel anomaly in the image, obtain a salience criteria for the image when the analysis of the image detects the presence of the pixel anomaly, and classify the pixel anomaly as one of a salient anomaly or an innocuous anomaly based on the salience criteria for the image. The hardware processor is further configured to execute the software code to disregard the pixel anomaly when the pixel anomaly is classified as an innocuous anomaly, and to flag the pixel anomaly when the pixel anomaly is classified as a salient anomaly.

20 Claims, 6 Drawing Sheets

(56) References Cited

U.S. PATENT DOCUMENTS

| | | | |
|---|---|---|---|
| 2009/0219379 A1* | 9/2009 | Rossato | G06T 7/194 |
| | | | 348/E7.078 |
| 2010/0085447 A1* | 4/2010 | Kanemitsu | H04N 5/357 |
| | | | 348/E5.079 |
| 2011/0033130 A1* | 2/2011 | Poon | H04N 19/85 |
| | | | 375/E7.076 |
| 2011/0091127 A1* | 4/2011 | Kisilev | G06T 5/002 |
| | | | 382/274 |
| 2013/0162871 A1* | 6/2013 | Bosco | G06T 5/005 |
| | | | 348/246 |
| 2014/0133774 A1 | 5/2014 | Chen | |
| 2016/0065959 A1 | 3/2016 | Stobaugh | |
| 2016/0321523 A1 | 11/2016 | Sen | |
| 2018/0150684 A1 | 5/2018 | Wang | |
| 2018/0253624 A1 | 9/2018 | Schafer | |
| 2019/0114761 A1* | 4/2019 | Bhattacharya | G06T 5/005 |

OTHER PUBLICATIONS

U.S. Appl. No. 16/243,650, filed Jan. 9, 2019 and titled "Pixel Error Detection System."
Hou, et al. "Deep Feature Consistent Variational Autoencoder," *2017 IEEE Winter Conference on Applications of Computer Vision*, 2017. pp. 1133-1141.
An, et al. "Variational Autoencoder based Anomaly Detection using Reconstruction Probability," *2015—2 Special Lecture on IE*, 2015. pp. 1-18.
Cong, et al. "Review of Visual Saliency Detection with Comprehensive Information," *IEEE Transactions on Circuits and Systems for Video Technology*, 2018. pp. 1-19.

\* cited by examiner

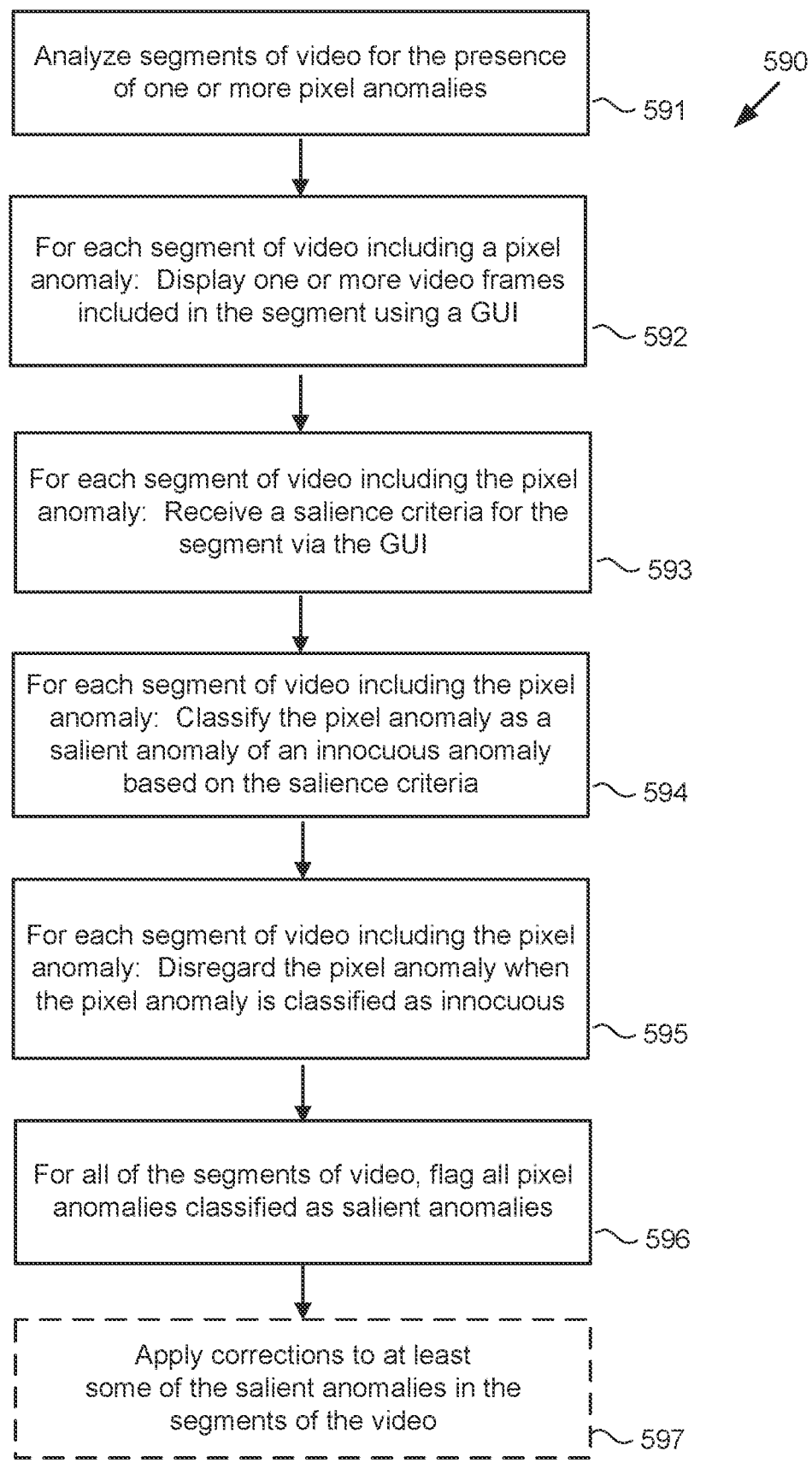

AUTOMATED SALIENCE ASSESSMENT OF PIXEL ANOMALIES

BACKGROUND

Pixel errors in images occur with regularity but can be difficult and costly to identify and correct. For example, anomalous pixels in video frames can be introduced by many different processes within a video production pipeline. A final quality procedure for detecting and correcting such errors is typically done before the video undergoes final release.

In the conventional art, anomalous pixel detection is usually performed by human inspectors. Generally, those human inspectors are tasked with checking every single frame of each video several hundreds of times before its final distribution. Due to this intense reliance on human participation, the conventional approach to pixel error detection and correction is undesirably expensive and time consuming. Moreover, not all pixel anomalies require correction. For example, depending on its position within an image, as well as its relationship to particularly important features within the image, some pixel anomalies may reasonably be disregarded. That is to say, not all pixel errors are sufficiently salient to justify the costs associated with their correction. Accordingly, there is a need in the art for an automated solution enabling the accurate assessment of the salience of anomalous pixel errors detected in an image.

SUMMARY

There are provided systems and methods for performing automated salience assessment of pixel anomalies, substantially as shown in and/or described in connection with at least one of the figures, and as set forth more completely in the claims.

BRIEF DESCRIPTION OF THE DRAWINGS

FIG. 5 shows a flowchart presenting an exemplary method for performing automated salience assessment of pixel anomalies, according to another implementation.

DETAILED DESCRIPTION

Figure 1A:
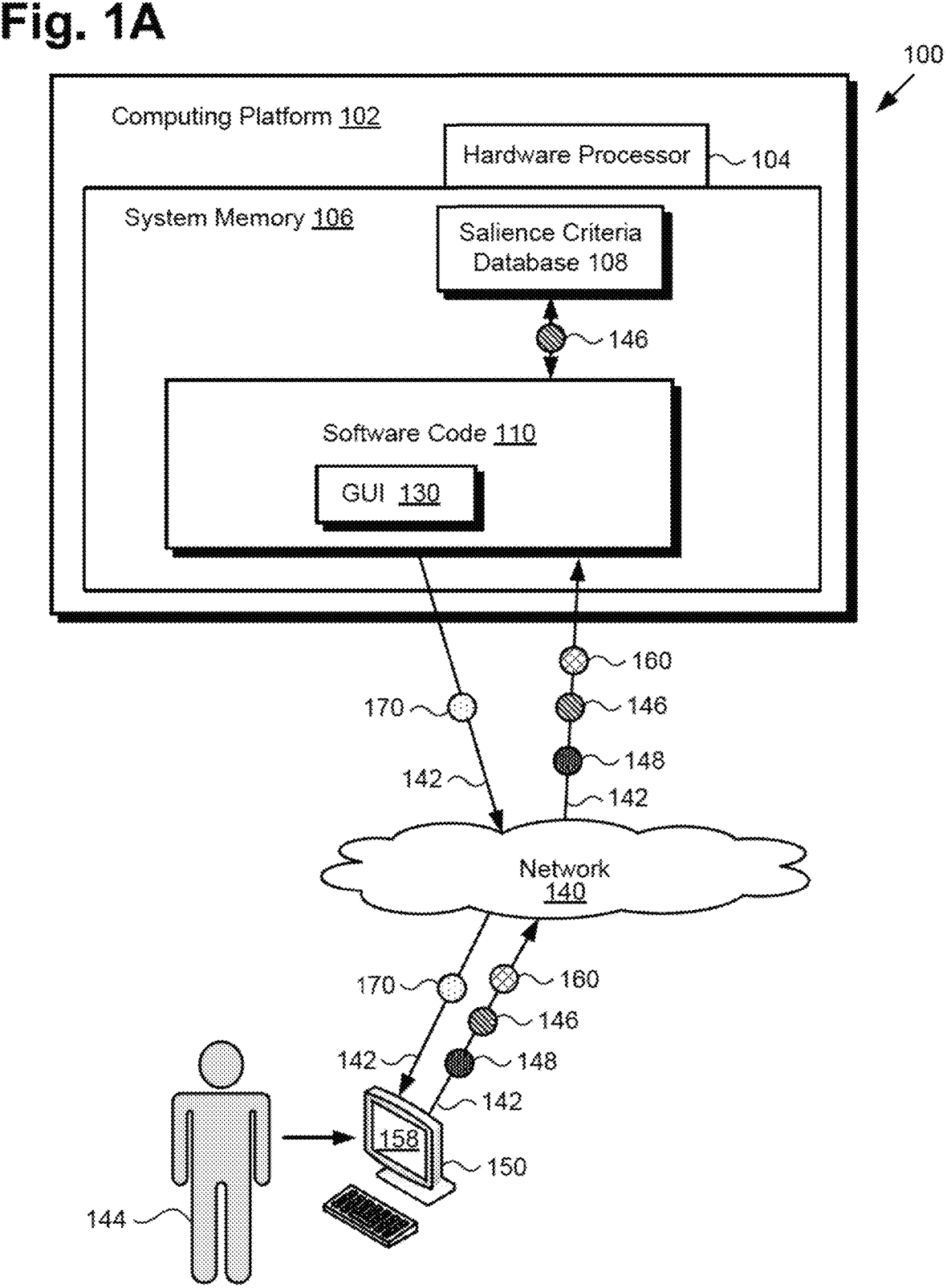
FIG. 1A shows a diagram of an exemplary system for performing automated salience assessment of pixel anomalies, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions. The present application discloses systems and methods for performing automated salience assessment of pixel anomalies that overcome the drawbacks and deficiencies in the conventional art. It is noted that the methods disclosed by the present application may be performed as substantially automated processes by substantially automated systems. It is further noted that, as used in the present application, the terms "automation," "automated", and "automating" refer to systems and processes that do not require the participation of a human user performing image inspection. Although, in some implementations, a human inspector may review the performance of the automated systems described herein, that human involvement is optional. Thus, the methods described in the present application may be performed under the control of hardware processing components of the disclosed automated systems.

FIG. 1A shows a diagram of exemplary system 100 for performing automated salience assessment of pixel anomalies, according to one implementation. As discussed below, in some implementations, system 100 may be implemented using a computer server accessible over a local area network (LAN) or may be implemented as cloud-based system. As shown in FIG. 1A, system 100 includes computing platform 102 having hardware processor 104, and system memory 106 implemented as a non-transitory storage device storing software code 110 providing graphical user interface (GUI) 130. In addition, in some implementations, system memory 106 may also store salience criteria database 108.

As further shown in FIG. 1A, system 100 is implemented within a use environment including communication network 140 and user system 150 including display 158. User system 150 is configured to be utilized by user 144. Also shown in FIG. 1A are network communication links 142 interactively connecting user system 150 and system 100 via communication network 140, image or images 160 (hereinafter "image(s) 160"), salience criteria 146 for assessing pixel anomalies in image(s) 160, one or more corrections 148 to image(s) 160, and report 170 flagging one or more salient pixel anomalies in image(s) 160.

It is noted that image(s) 160 may correspond to a single digital image, such as a digital photograph, or to video content including one or more frames of video or one or more segments of a video stream, such as one or more "shots" of video or one or more scenes of video, for example. It is further noted that, as used in the present application, a "shot" refers to a sequence of video frames that is captured from a unique camera perspective without cuts and/or other cinematic transitions. Thus, in various implementations, image(s) 160 may correspond to a single frame of video, a single shot of video including multiple individual video frames, or to a scene or scenes including multiple shots.

It is also noted that, although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 1A depicts software code 110 as being stored in its entirety in system memory 106, which representation is also provided merely as an aid to conceptual clarity. More generally, system 100 may include one or more computing platforms 102, such as computer servers for example, which may be co-located, or may form an interactively linked but distributed system, such as a cloud-based system, for instance.

As a result, hardware processor 104 and system memory 106 may correspond to distributed processor and memory resources within system 100. Thus, it is to be understood that various features of software code 110, such as the software modules described in greater detail below by reference to FIG. 2, may be stored and/or executed using the distributed memory and/or processor resources of system 100.

According to the implementation shown by FIG. 1A, user 144 may utilize user system 150 to interact with system 100 over communication network 140. In one such implementation, computing platform 102 may correspond to one or more web servers, accessible over a packet-switched network such as the Internet, for example. Alternatively, computing platform 102 may correspond to one or more computer servers supporting a wide area network (WAN), a LAN, or included in another type of limited distribution or private network.

Although user system 150 is shown as a desktop computer in FIG. 1A, that representation is also provided merely as an example. More generally, user system 150 may be any suitable mobile or stationary computing device or system that implements data processing capabilities sufficient to provide a user interface, support connections to communication network 140, and implement the functionality ascribed to user system 150 herein. For example, in other implementations, user system 150 may take the form of a laptop computer, tablet computer, or smartphone, for example. User 144 may utilize user system 150 to interact with system 100 to use software code 110, executed by hardware processor 104, to perform automated salience assessment of pixel anomalies detected in image(s) 160 by system 100.

It is noted that, in various implementations, report 170 flagging one or more salient pixel anomalies in image(s) 160, when generated using software code 110, may be stored in system memory 106 and/or may be copied to non-volatile storage. Alternatively, or in addition, in some implementations report 170 may be displayed to user 144 via display 158 of user system 150 and GUI 130.

With respect to display 158 of user system 150, display 158 may be physically integrated with user system 150 or may be communicatively coupled to but physically separate from user system 150. For example, where user system 150 is implemented as a smartphone, laptop computer, or tablet computer, display 158 will typically be integrated with user system 150. By contrast, where user system 150 is implemented as a desktop computer, display 158 may take the form of a monitor separate from user system 150 in the form of a computer tower. Moreover, display 158 may be implemented as a liquid crystal display (LCD), a light-emitting diode (LED) display, an organic light-emitting diode (OLED) display, or any other suitable display screen that performs a physical transformation of signals to light.

By way of overview, a pixel or pixels within an image may be identified as anomalous, i.e., having a defect, according to its context. For example, a human observer would typically identify an image region corresponding to one or more pixels as anomalous based on its color relative to surrounding pixels in the image. If, subjectively to the human observer, the image region color appears to vary too much from its surroundings, an anomaly is suspected. As noted above, in the conventional art, anomalous pixel detection is usually performed by human inspectors. Generally, those human inspectors are tasked with checking every single frame of each video several hundreds of times before its final distribution. Due to this intense reliance on human participation, the conventional approach to pixel error detection and correction is undesirably expensive and time consuming.

Moreover, and as further noted above, not all pixel anomalies require correction. For example, depending on its position in the foreground or background of an image, as well as its relationship to particularly important features or primary characters within the image, some pixel anomalies may reasonably be disregarded. That is to say, not all pixel errors are sufficiently salient to justify the costs associated with their correction. Accordingly, system 100 is configured to accurately assess the salience of anomalous pixel errors detected in image(s) 160 and to flag only those that satisfy a salience criteria, which may be predetermined, or may be determined dynamically based on inputs to GUI 130 by user 144. Regarding the concept of pixel anomaly salience or saliency, a review of image saliency detection and determination is described in the publication titled "Review of Visual Saliency Detection with Comprehensive Information," by Cong et al. (see Runmin Cong, Jianjun Lei, Huazhu Fu, Ming-Ming Cheng, Weisi Lin, and Qingming Huang, IEEE Transactions on Circuits and Systems for Video Technology, Vol. 29, Issue. 10, October 2019), which is hereby incorporated fully by reference into the present application.

It is noted that although in some implementations salience criteria 146 applied by system 100 may be determined dynamically based on user inputs to GUI 130, in other implementations salience may be calculated dynamically based on the preceding and/or surrounding context of the image. That is to say, dynamic salience criteria 146 could adjust automatically based on the content of image(s) 160. For instance, a pixel anomaly that was of a particular residual value (where the residual is the difference between the expected value of that pixel and the actual value of the pixel) might not be deemed salient in an action scene including significant movement, but the same residual-valued anomaly might be deemed salient when it occurs in a low-movement, relatively stationary scene. In another example, a pixel anomaly might be deemed not salient when it occurs in the background edge of an image depicting a prominent focal character, but another image may not include focal characters and salience criteria 146 would then adjust to reflect that difference in the content of image(s) 160.

Implementation of such dynamic thresholding could be accomplished in a few different ways. In a use case in which image(s) 160 include a sequence of video frames from a movie, one approach includes using a machine learning trained model that predicts human visual attention to individual segments of the movie, such as shots or scenes. Each shot or scene could be analyzed using the predictive model to identify a mean score of attention, and salience criteria 146 could be determined dynamically, for example, based on two or three standard deviations away from that mean. Because the distribution would be calculated per shot or scene, salience criteria 146 would change per shot or scene as well.

Alternatively, in implementations in which system 100 determines salience based on predetermined values like "outside a character outline" versus "inside a character outline," an additional series of checks could be performed using object detection and structured metadata such as <center portion of screen>, <large object taking up min 60% of the screen>, <animate object>, <minor character>, <major character>, and so forth. In these implementations, system 100 could determine which metadata category the image(s) 160 correspond to and therefore which salience criteria 146 to use for determining pixel anomaly saliency. For example, a number of computer vision techniques, including machine learning convolutional neural networks, may be used to determine whether image(s) 160 correspond to any of the metadata categories described above, and if so, which regions of image(s) 160 correspond.

Figure 1B:
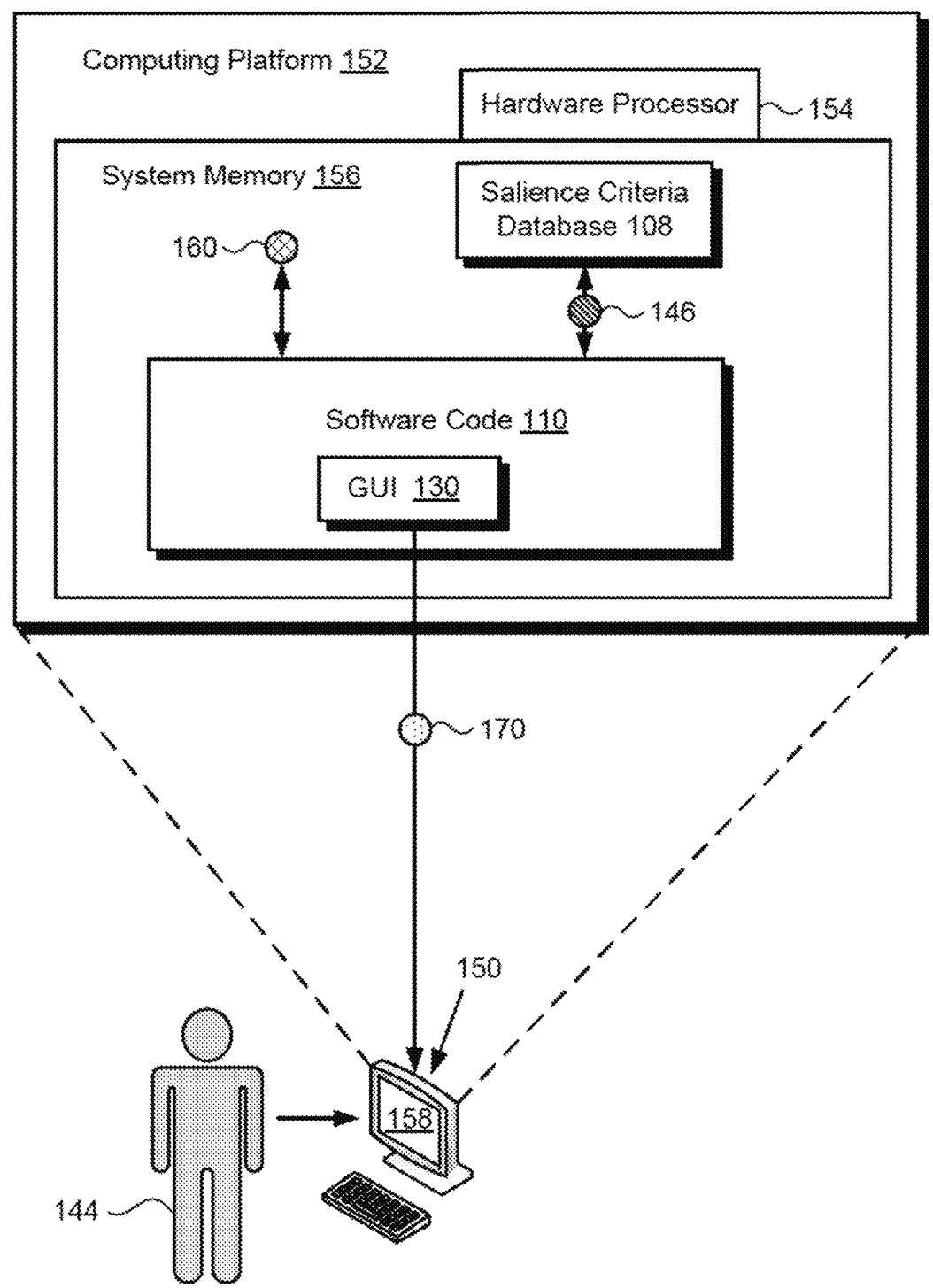
FIG. 1B shows a diagram of an exemplary system for performing automated salience assessment of pixel anomalies, according to another implementation.

FIG. 1B shows a diagram of an exemplary system, i.e., user system 150, for performing automated salience assessment of pixel anomalies, according to another implementation. It is noted that any features in FIG. 1B identified by reference numbers identical to those shown in FIG. 1A correspond respectively to those previously described features and may share any of the characteristics attributed to those corresponding features by the present disclosure. In addition to the features shown in FIG. 1A, FIG. 1B depicts user system 150 as including computing platform 152 having hardware processor 154 and system memory 156 implemented as a non-transitory storage device. According the exemplary implementation shown in FIG. 1B, system memory 156 stores salience criteria database 108 and software code 110 providing GUI 130. Also shown in FIG. 1B are user 144, images(s) 160, salience criteria 146, and report 170.

The implementation shown in FIG. 1B differs from that represented in FIG. 1A in that salience criteria database 108 and software code 110 are stored on user system 150, while software code 110 is executed locally using hardware processor 154 of computing platform 152. Thus, as shown in FIG. 1B, in some implementations, user system 150 may include all or substantially all of the features and functionality of system 100, in FIG. 1A.

Figure 2:
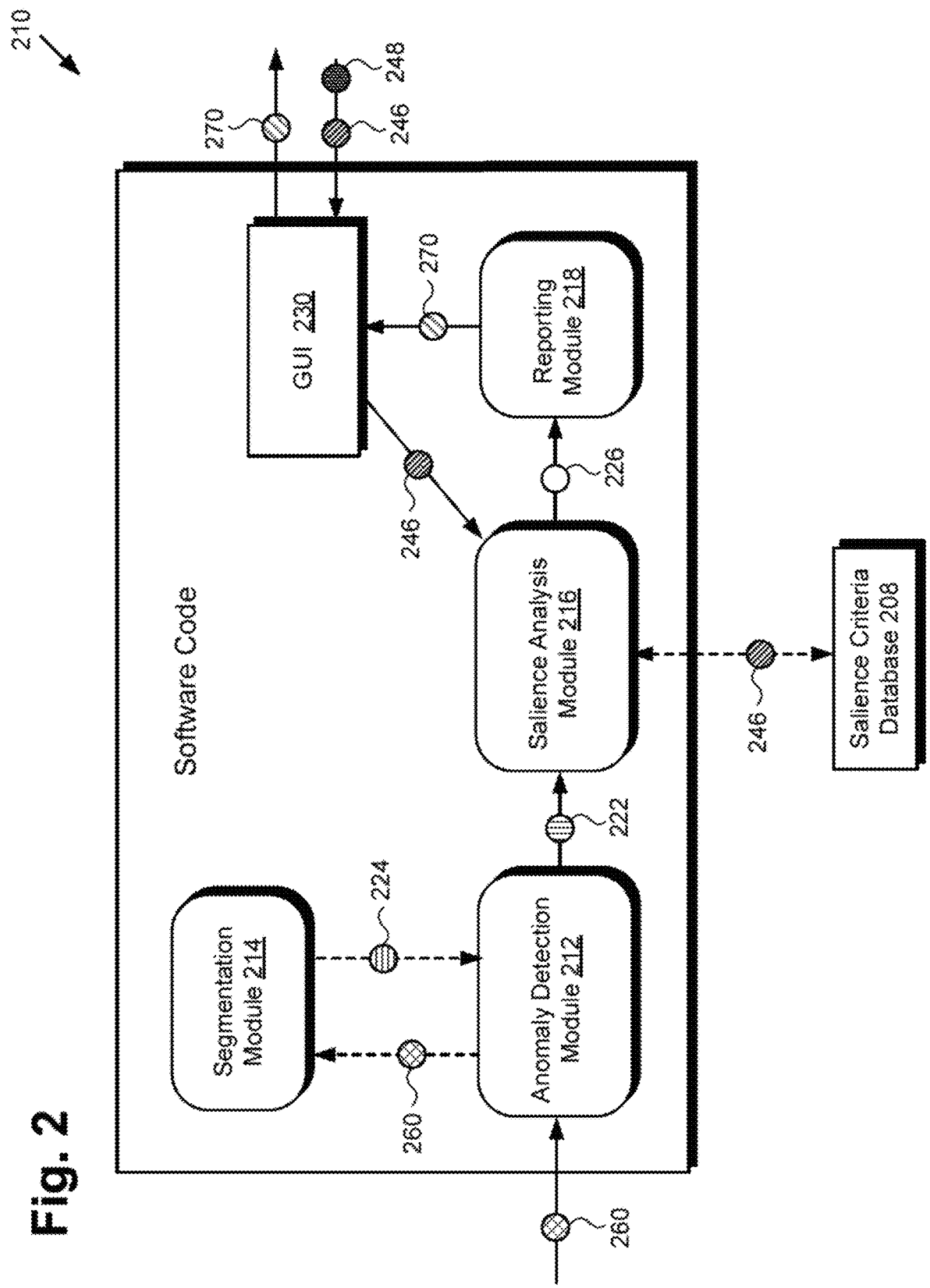
FIG. 2 shows a diagram of an exemplary software code suitable for execution by the hardware processors of the systems shown in FIGS. 1A and 1B, according to one implementation.

Referring now to FIG. 2, FIG. 2 shows a diagram of an exemplary software code suitable for execution by the hardware processors of the systems shown in FIGS. 1A and 1B, according to one implementation. As shown in FIG. 2, software code 210 is configured to receive one or more images 260 (hereinafter "image(s) 260") and to generate report 270 flagging any salient pixel anomalies detected in image(s) 260. As further shown in FIG. 2, software code 210 includes anomaly detection module 212, optional segmentation module 214, salience analysis module 216, reporting module 218, and GUI 230. In addition, FIG. 2 shows one or more pixel anomalies 222, segmentation data 224, salience criteria 246, one or more salient pixel anomalies 226, and report 270 flagging one or more salient pixel anomalies 226 in image(s) 260. Also shown in FIG. 2 are salience criteria database 208 optionally accessed by software code 210, and one or more corrections 248 to image(s) 260 received via GUI 230.

Image(s) 260, report 270, software code 210, GUI 230, salience criteria database 208, and salience criteria 246 correspond in general to image(s) 160, report 170, software code 110, GUI 130, salience criteria database 108, and salience criteria 146, in FIGS. 1A and 1B. As a result, image(s) 260, report 270, software code 210, GUI 230, salience criteria database 208, and salience criteria 246 may share any of the features attributed to respective image(s) 160, report 170, software code 110, GUI 130, salience criteria database 108, and salience criteria 146 by the present disclosure, and vice versa. That is to say, like software code 210, in addition to providing GUI 130, software code 110 may include features corresponding respectively to anomaly detection module 212, optional segmentation module 214, salience analysis module 216, and reporting module 218.

In addition, one or more corrections 248, in FIG. 2, corresponds/correspond in general to one or more corrections 148 in FIG. 1A, and those corresponding features may share any of the characteristics attributed to either corresponding feature by the present disclosure. Referring to FIG. 1A and FIG. 1B, one or more corrections 148/248 may be received via GUI 130/230 from user system 150 as the result of correction inputs to user system 150 by user 144.

Figure 3:
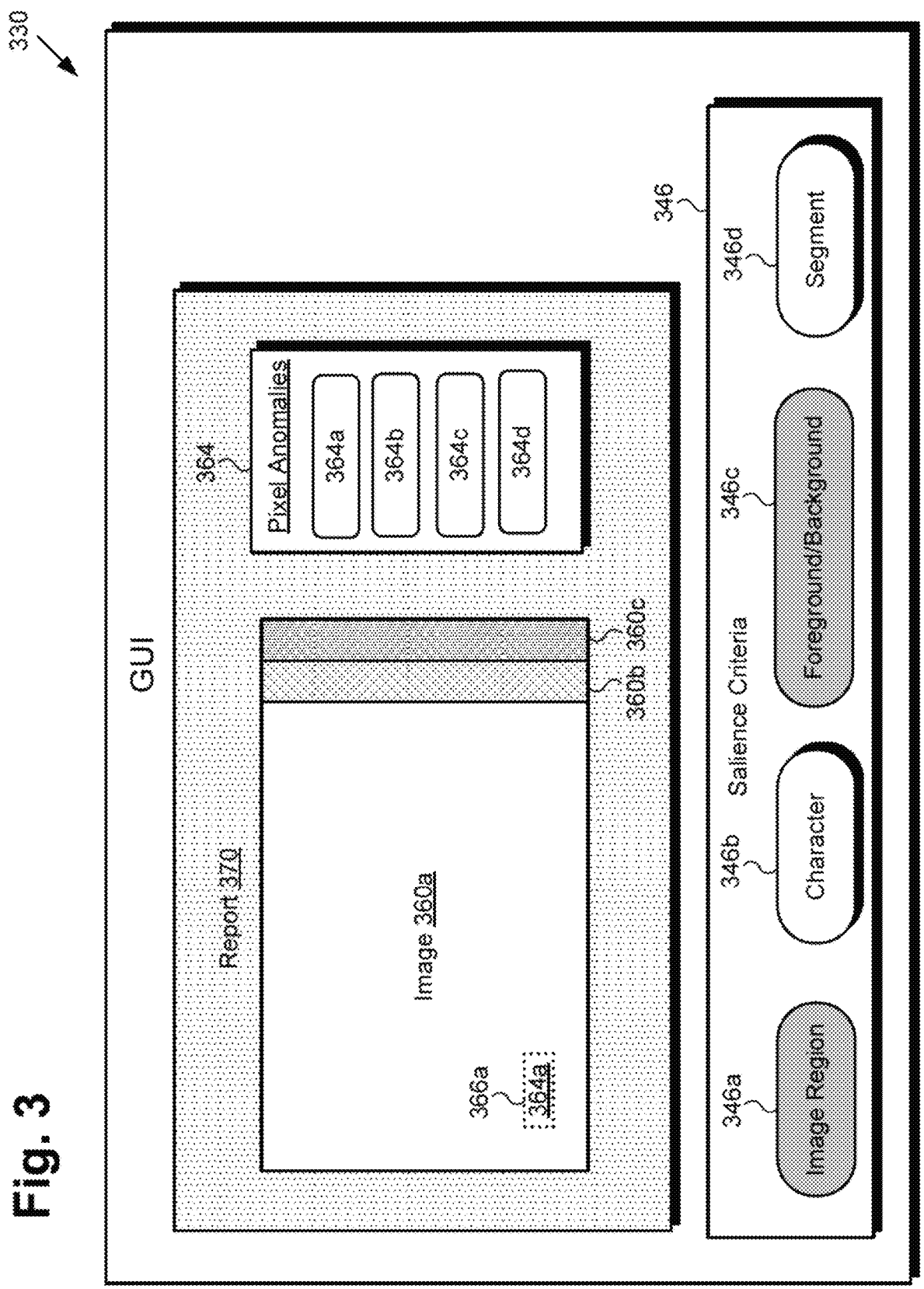
FIG. 3 shows an exemplary graphical user interface (GUI) provided by the software code shown in FIGS. 1A, 1B, and 2, according to one implementation.

FIG. 3 shows exemplary GUI 330 provided by software code 110/210, according to one implementation. As shown in FIG. 3, GUI 330 may display report 370 including a list of pixel anomalies 364 detected in images 360*a*, 360*b*, and 360*c* (hereinafter "images 360*a*-360*c*"), i.e., pixel anomalies 364*a*, 364*b*, 364*c*, and 364*d* (hereinafter "pixel anomalies 364*a*-364*d*"), either before or after classification of pixel anomalies 364 as salient or innocuous (not salient) based on salience criteria 346. Images 360*a*-360*c* correspond in general to image(s) 160/260 in FIGS. 1A, 1B, and 2, while report 370 corresponds in general to report 170/270, in those figures. That is to say, images 360*a*-360*c* and report 370 may include any of the characteristics attributed to respective image(s) 160/260 and report 170/270 by the present disclosure, and vice versa. In addition, GUI 330 and salience criteria 346, in FIG. 3, correspond respectively in general to GUI 130/230 and salience criterial 146/246 in FIGS. 1A, 1B, and 2. Thus, GUI 130/230 and salience criteria 146/246 may share any of the characteristics attributed to respective GUI 330 and salience criteria 346 by the present disclosure, and vice versa.

Referring to FIGS. 1A, 1B, 2, and 3 in combination, it is noted that in some implementations, salience criteria 146/246/346 for image(s) 160/260/360*a*-360*c* may be predetermined salience criteria, and may be stored in salience criteria database 108/208. However, in other implementations, salience criteria 146/246/346 may be obtained as one or more inputs from user 144. As shown in FIG. 3, inputs to GUI 330 may result in one or more of image region criteria 346*a*, character criteria 346*b*, foreground/background criteria 346*c*, or content segment criteria 346*d* being applied to classify pixel anomalies 364 detected in images 360*a*-360*c*. According to the exemplary use case shown by FIG. 3, character criteria 346*b* and content segment criteria 346*d* have been selected by user 144. By contrast, image region criteria 346*a* and foreground/background criteria 346*c* are shown as grayed out to indicate that they are not presently being applied.

As further shown in FIG. 3, report 370 may flag the presence of a salient pixel anomaly in an image. For example, where pixel anomaly 364*a* in image 360*a* is classified as salient, the location of that salient pixel anomaly may be identified in image 360*a* through use of a bounding box or border 366a surrounding the location of the salient pixel anomaly in image 360a.

Image region criteria 346a may allow user 144 to specify one or more regions of images 360a-360c as being more sensitive to the presence of pixel anomalies than other regions of those images. In those implementations, pixel anomalies 364 determined to be located within a region identified by user 144 may be classified as salient, while those pixel anomalies located outside of the sensitive region or regions may be disregarded as innocuous.

It is noted that, in some implementations, image region criteria 346a may identify a region of interest explicitly, for example providing x-y coordinates defining a region of interest. Alternatively, or in addition, user 144 may identify a region of interest explicitly by manually drawing a box or window around the region of interest, using GUI 330. As yet another alternative, or in addition, image region criteria 346a may identify a region of interest implicitly, for example, by specifying the color values of pixel regions of interest.

Character criteria 346b may allow user 144 to specify one or more characters whose appearance is particularly important to the esthetic of images 360a-360c. In those implementations, pixel anomalies 364 determined to be located on or between characters identified by user 144 may be classified as salient, for example, while those pixel anomalies located at least some threshold distance away from such characters may be disregarded as innocuous. It is noted that, in some implementations, the threshold distance distinguishing potentially salient anomalies from innocuous anomalies may be predetermined. Alternatively, or in addition, in some implementations, such a threshold distance may be a user selectable parameter. As yet another alternative, or in addition, in some implementations, the threshold distance distinguishing potentially salient anomalies from innocuous anomalies may be determined dynamically, based on the type of content of images 360a-360c.

In one implementation a proportional pixel area surrounding the outline of a character may establish the threshold distance distinguishing potentially salient anomalies from innocuous anomalies. Merely by way of example, a two percent or other percentage increase in character estimated area might extend the threshold distance to a greater degree for larger or closer characters taking up more space, and to a lesser degree for smaller or more distant characters.

Foreground/background criteria 346c may allow user 144 to designate one of the foreground or background of images 360a-360c as being of greater esthetic importance to one or more of images 360a-360c. In use cases where user 144 designates the foreground as being more important, pixel anomalies located in the foreground may be classified as salient pixel anomalies, while those located in the background may be disregarded as innocuous. Conversely, in use cases where user 144 designates the background as being more important, pixel anomalies located in the background may be classified as salient pixel anomalies, while those located in the foreground may be disregarded as innocuous.

Content segment criteria 346d may allow user 144 to specify salience criteria 346 by content segments, such as one or more frames, shots, or scenes of video. That is to say, in implementations in which image(s) 160/260 or one of images 360a-360c is a video frame, content segment criteria 346d for the image may be determined based on one of a shot of the video that includes the video frame or a scene of the video that includes the video frame. For example, in some use cases, user 144 may opt to specify salience criteria 346 one time for a shot, a scene, or any other user selected segment of content, e.g., a portion of a shot or scene, or multiple shots or scenes. In those use cases, the same salience criteria may be automatically applied to each frame in the user selected segment, thereby advantageously relieving user 144 of the burden of specifying salience criteria 346 for every frame individually. However, in some use cases user 144 may prefer to specify salience criteria 346 on a frame-by-frame basis, in which cases the present automated solution for assessing salience of pixel anomalies enables user 144 to do so.

In use cases where user 144 selects content segment criteria 346d, for example, user 144 may vary other salience criteria 346 from segment to segment of the content including images 360a-360c. Moreover, in some implementations, GUI 130/230/330 may be configured to prompt user 144 to provide an input selecting one or more salience criteria, either because the end of a segment has been reached, or based on any other relevant criteria.

Figure 4:
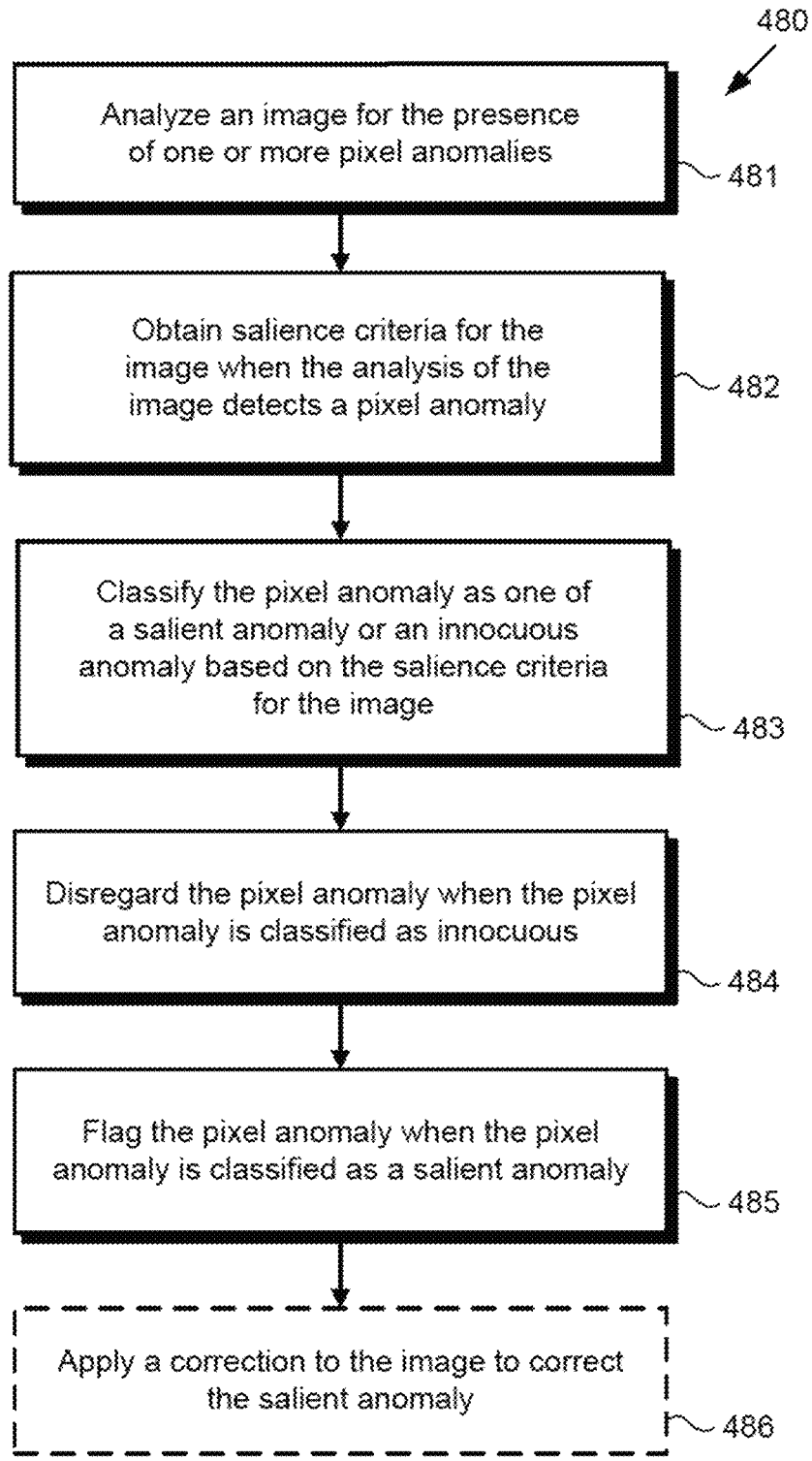
FIG. 4 shows a flowchart presenting an exemplary method for performing automated salience assessment of pixel anomalies, according to one implementation.

The functionality of software code 110/210 and GUI 130/230/330 will be further described by reference to FIG. 4, in combination with FIGS. 1A, 1B, 2, and 3. FIG. 4 shows flowchart 480 presenting an exemplary method for performing automated salience assessment of pixel anomalies, according to one implementation. With respect to the method outlined in FIG. 4, it is noted that certain details and features have been left out of flowchart 480 in order not to obscure the discussion of the implementations described in the present application.

Flowchart 480 begins with analyzing image(s) 160/260/360a-360c for the presence of one or more pixel anomalies 222 (action 481). By way of example, and as shown by FIGS. 1A and 2, in one implementation, user 144 may utilize user system 150 to interact with system 100 in order to assess the salience of one or more pixel anomalies 222 included in image(s) 160/260, each of which may be a digital photograph or one or more video frames, for instance. As further shown by FIG. 1A, user 144 may transmit image(s) 160 from user system 150 to system 100 via communication network 140 and network communication links 142. Alternatively, image(s) 160 may be received from a third party source, or may be stored in system memory 106.

Alternatively, and as shown by FIGS. 1B and 2, in some implementations, user 144 may utilize user system 150 to assess the salience of one or more pixel anomalies 222 included in image(s) 160/260 locally, using the processor and memory resources of user system 150. In those implementations, image(s) 160/260 may be obtained from system memory 156 of user system 150.

Referring to FIGS. 1A, 1B, and 2 in combination, analysis of image(s) 160/260 for the presence of one or more pixel anomalies 222 may be performed using anomaly detection module 212 of software code 110/210, executed by hardware processor 104 of system 100, or by hardware processor 154 of user system 150. It is noted that action 481 may be performed using any suitable pixel error detection method, including, but not limited to the methods described by U.S. patent application Ser. No. 16/243,650, filed on Jan. 9, 2019 and titled "Pixel Error Detection System," or by U.S. patent application Ser. No. 16/836,453, filed on Mar. 31, 2020, and titled "Automated Pixel Error Detection Using an Inpainting Neural Network," both of which documents are incorporated fully by reference into the present application.

Flowchart 480 continues with obtaining salience criteria 146/246/346 for image(s) 160/260/360a-360c when the analysis of image(s) 160/260 detects the presence of pixel anomaly 222 (action 482). As discussed above, in some implementations, salience criteria 146/246 for image(s) 160/260/360a-360c may be predetermined salience criteria, and may be stored on salience criteria database 108/208. In some of those implementations, as shown in FIG. 1A, action 482 may correspond to retrieving or otherwise obtaining salience criteria 146 from salience criteria database 108 stored in system memory 106 by software code 110, executed by hardware processor 104. However, in other implementations, salience criteria database 108 may not be stored in system memory 106, but rather may be remote from system 100. In those implementations, hardware processor 104 may execute software code 110 obtaining salience criteria 146 by accessing salience criteria database 108 via communication network 140 and network communication links 142.

Referring to FIG. 3, in yet other implementations, salience criteria 346 may be obtained as one or more inputs to GUI 330. As shown in FIG. 3, inputs to GUI 330 may result in one or more of image region criteria 346a, character criteria 346b, foreground/background criteria 346c, or content segment criteria 346d being applied to classify a pixel anomaly detected in images 360a-360c, as discussed above.

It is noted that although the exemplary method outlined by flowchart 480 describes analyzing image(s) 160/260/360a-360c for the presence of one or more pixel anomalies 222 in action 481, followed by obtaining salience criteria 146/246/346 for image(s) 160/260/360a-360c in action 482, in some implementations, action 482 may be performed prior to action 481. Identifying regions of interest images 160/260/360a-360c first, and then analyzing those specific regions of interest for the presence of one or more pixel anomalies 222, may advantageously reduce the computational overhead required to detect salient anomalous pixels.

The exemplary method outlined by flowchart 480 continues with classifying pixel anomaly 222 detected in action 481 as one of a salient anomaly or an innocuous anomaly based on salience criteria 146/246/346 for image(s) 160/260/360a-360c (action 483). The classification of pixel anomaly 222 detected in action 481 may be performed using salience analysis module 216 of software code 110/210, executed by hardware processor 104 of system 100, or by hardware processor 154 of user system 150.

Flowchart 480 continues with disregarding pixel anomaly 222 detected in action 481 when pixel anomaly 222 is classified as an innocuous anomaly in action 483 (action 484). As discussed above, not all pixel anomalies 222 in image(s) 160/260/360a-360c may justify the time and/or cost associated with their correction. Thus, those pixel anomalies 222 determined not to meet the salience criteria obtained in action 482 may be disregarded without substantially compromising the esthetics of image(s) 160/260. Action 484 may be performed using salience analysis module 216 of software code 110/210, executed by hardware processor 104 of system 100, or by hardware processor 154 of user system 150.

Flowchart 480 continues with flagging pixel anomaly 222 detected in action 481 when pixel anomaly 222 is classified as salient pixel anomaly 226 in action 484 (action 485). As discussed above, pixel anomalies 222 in image(s) 160/260 are sufficiently salient, based for example on their location in image(s) 160/260 or their proximity to a featured character or object in image(s) 160/260 to justify the time and/or cost associated with their correction. Thus, those of pixel anomalies 222 determined to satisfy the salience criteria obtained in action 482 may be flagged in image(s) 160/260 and be included in report 170/270/370 output via GUI 130/230/330. Action 485 may result in generation of report 170/270, and may be performed using reporting module 218 of software code 110/210, executed by hardware processor 104 of system 100, or by hardware processor 154 of user system 150.

It is noted that report 170/270 flagging pixel anomaly 226 detected in image(s) 160/260/360a-360c may be an interactive report enabling user 144 to toggle and view: a) all detected pixel anomalies, b) only pixel anomalies classified as salient pixel anomalies, with optionally some marker or color distinction between salient and innocuous anomalies. In some implementations, report 170/270 may also include the timestamp of each frame including a salient pixel anomaly, or any pixel anomaly, a visual representation of the frame with anomalous region(s) identified, e.g., with circles or boxes, and optionally a close-up representation of each anomalous region for enhanced visual confirmation.

It is further noted that although the exemplary method outlined by flowchart 480 describes disregarding detected pixel anomaly 222 when pixel anomaly 222 is classified as innocuous, in action 484, followed by flagging detected pixel anomaly 222 when pixel anomaly 222 is classified as salient, in action 485, that sequence is provided merely as an example. In various implementations of the present method, actions 484 and 485 may be performed substantially concurrently, action 485 may precede action 484, or one of actions 484 or 485 may be omitted. For instance, where detected pixel anomaly 222 is classified as salient, action 484 may be omitted and action 485 may immediately follow action 483. Conversely, where detected pixel anomaly 222 is classified as innocuous, action 485 may be omitted and flowchart 480 may conclude with action 484.

As noted, in some implementations flowchart 480 can conclude with action 484, or with action 485, described above. However, in other implementations, flowchart 480 may continue and conclude with optionally applying correction 148/248 to image(s) 160/260 to correct salient anomaly 226 (action 486). In one implementation, for example, correction 148/248 may be applied to image(s) 160/260 to correct salient anomaly 226 in an automated process, by software code 110/210, executed by hardware processor 104 of system 100, or by hardware processor 154 of user system 150. In other implementations, salient anomaly 226 may be flagged to user 144 for correcting salient anomaly 226. In those other implementations, software code 110/210, executed by hardware processor 104 of system 100, or executed by hardware processor 154 of user system 150, may receive correction 148/248 to image(s) 160/260 for correcting salient anomaly 226 from user 144. Moreover, in those implementations, software code 110/210, executed by hardware processor 104 of system 100, or executed by hardware processor 154 of user system 150, may apply correction 148/248 to image(s) 160/260, in response to receiving correction 148/248 from user 144.

FIG. 5 shows flowchart 590 presenting an exemplary method for performing automated salience assessment of pixel anomalies, according to another implementation. With respect to the method outlined in FIG. 5, it is noted that certain details and features have been left out of flowchart 590 in order not to obscure the discussion of the implementations described in the present application.

Flowchart 590 begins with analyzing segments of video included in image(s) 160/260/360a-360c for the presence of one or more pixel anomalies 222 (action 591). By way of example, and as shown by FIGS. 1A and 2, in one implementation, user 144 may utilize user system 150 to interact with system 100 in order to assess the salience of one or more pixel anomalies 222 included in image(s) 160/260, which may include segments of video in the form of shots of video or scenes of video, for instance. As further shown by FIG. 1A, user 144 may transmit image(s) 160 from user system 150 to system 100 via communication network 140 and network communication links 142. Alternatively, image(s) 160 may be received from a third party source, or may be stored in system memory 106.

Alternatively, and as shown by FIGS. 1B and 2, in some implementations, user 144 may utilize user system 150 to assess the salience of one or more pixel anomalies 222 included in image(s) 160/260 locally, using the processor and memory resources of user system 150. In those implementations, image(s) 160/260 may be obtained from system memory 156 of user system 150.

Referring to FIGS. 1A, 1B, and 2 in combination, in some implementations, the segments of video included in image(s) 160/260 may be predetermined and may be identified by anomaly detection module 212 of software code 110/210, based on metadata included in image(s) 160/260. However, in other implementations, analysis of the segments of video included among image(s) 160/260 for the presence of one or more pixel anomalies 222 may include segmenting image(s) 160/260, by shots or scenes for example, using optional segmentation module 214 of software code 110/210, to produce segmentation data 224 identifying the segments of video.

Thus, according to the exemplary implementation shown by FIG. 1A, action 591 may be performed by software code 110/210, executed by hardware processor 104 of system 100, and using anomaly detection module 212 either alone or in combination with optional segmentation module 214. According to the exemplary implementation shown by FIG. 1B, action 591 may be performed by software code 110/210, executed by hardware processor 154 of user system 150, and using anomaly detection module 212 either alone or in combination with optional segmentation module 214. It is noted that although anomaly detection module 212 analyzes image(s) 160/260/360a-360c, segment data 224 is important for implementations in which user 144 has specified what criteria to use for saliency in particular segments, as discussed above. Otherwise the system would not recognize when to reset the salience criteria, or to prompt user 144 to confirm their salience criteria on the next segment.

Analysis of the segments of video included in image(s) 160/260 for the presence of anomalous pixels in action 591 may be performed using any suitable pixel error detection method. Merely by way of example, pixel error detection may be performed according to the methods described by U.S. patent application Ser. No. 16/243,650, filed on Jan. 9, 2019 and titled "Pixel Error Detection System," or by U.S. patent application Ser. No. 16/836,453, filed on Mar. 31, 2020, and titled "Automated Pixel Error Detection Using an Inpainting Neural Network," both of which documents, as noted above, have been incorporated fully by reference into the present application.

Flowchart 590 continues with, for each segment of video including pixel anomaly 222, displaying one or more video frames included in the segment using GUI 130/230/330 (action 592). For example, where image(s) 160/260 include video segments one of which is found to include pixel anomaly 222, and where images 360a-360c are also included in that segment of video including pixel anomaly 222, action 592 corresponds to displaying one or more of images 360a-360 using GUI 330. According to the exemplary implementation shown by FIG. 1A, action 592 may be performed by software code 110, executed by hardware processor 104 of system 100. According to the exemplary implementation shown by FIG. 1B, action 592 may be performed by software code 110, executed by hardware processor 154 of user system 150.

Referring to FIGS. 2, 3, and 5 in combination, flowchart 590 continues with, for each segment of video including pixel anomaly 222, receiving salience criteria 246/346 for the video segment including one or more of images 260/360a-360c displayed in action 592, via GUI 330 (action 593). As discussed above, inputs to GUI 330 may result in one or more of image region criteria 346a, character criteria 346b, foreground/background criteria 346c, or content segment criteria 346d being applied to classify pixel anomaly 222 detected in images 260/360a-360c, as discussed above. Referring also to FIGS. 1A and 1B, according to the exemplary implementation shown by FIG. 1A, action 593 may be performed by software code 110/210, executed by hardware processor 104 of system 100, and using salience analysis module 216. According to the exemplary implementation shown by FIG. 1B, action 593 may be performed by software code 110/210, executed by hardware processor 154 of user system 150, and using salience analysis module 216.

It is noted that although the exemplary method outlined by flowchart 590 describes analyzing segments of video included in image(s) 160/260/360a-360c in action 591 before receiving salience criteria 146/246/346 in action 593, in some implementations, action 593 may be performed prior to action 591. Receiving salience criteria 146/246/346 first, and then analyzing segments of vide for pixel anomalies based on that salience criteria, may advantageously reduce the computational overhead required to detect salient anomalous pixels. Thus, in some implementations, action 593 may precede action 591.

Flowchart 590 continues with, for each segment of video including pixel anomaly 222, classifying pixel anomaly 222 as one of salient anomaly 226 or an innocuous anomaly based on salience criteria 146/246/346 for the segment of video including pixel anomaly 222 (action 594). The classification of pixel anomaly 222 may be performed using salience analysis module 216 of software code 110/210, executed by hardware processor 104 of system 100, or by hardware processor 154 of user system 150.

Flowchart 590 continues with, for each segment of video including pixel anomaly 222, disregarding pixel anomaly 222 when pixel anomaly 222 is classified as an innocuous anomaly in action 594 (action 595). As discussed above, not all pixel anomalies 222 in image(s) 160/260/360a-360c may justify the time and/or cost associated with their correction. Thus, those of pixel anomalies 222 determined not to meet the salience criteria received in action 591 may be disregarded without substantially compromising the esthetics of the segment of video including images 360a-360c. Action 595 may be performed using salience analysis module 216 of software code 110/210, executed by hardware processor 104 of system 100, or by hardware processor 154 of user system 150.

Flowchart 590 continues with, for all of the segments of video included in images 160/260/360a-360c, flagging all pixel anomalies 222 classified as salient anomalies 226 (action 596). As discussed above, some pixel anomalies 222 are sufficiently salient, based for example on their location in segments of video included in image(s) 160/260/360a-360c or their proximity to a featured character or object depicted in segments of video included in image(s) 160/260/360a-360c to justify the time and/or cost associated with their correction. Thus, those of pixel anomalies 222 in image(s) determined to satisfy salience criteria 146/246 may be flagged and included in report 170/270/370 output via GUI 130/230/330. Action 596 may be performed using reporting module 218 of software code 110/210, executed by hardware processor 104 of system 100, or by hardware processor 154 of user system 150.

It is noted that although the exemplary method outlined by flowchart 590 describes disregarding detected pixel anomaly 222 when pixel anomaly 222 is classified as innocuous, in action 595, followed by flagging all salient anomalies 226, in action 596, that sequence is provided merely as an example. In various implementations of the present method, actions 595 and 596 may be performed substantially concurrently, action 596 may precede action 595, or one of actions 595 or 596 may be omitted. For instance, where only salient anomalies 226 are detected, action 595 may be omitted and action 596 may immediately follow action 594. Conversely, where only innocuous pixel anomalies are detected, action 596 may be omitted and flowchart 590 may conclude with action 595.

As noted, in some implementations flowchart 590 can conclude with action 595, or with action 596, described above. However, in other implementations, flowchart 590 may continue and conclude with optionally applying corrections 148/248 to at least some of salient anomalies 226 in the segments of video included in image(s) 160/260/360a-360c (action 597). In one implementation, for example, corrections 148/248 may be applied to at least some of salient anomalies 226 in the segments of video included in image(s) 160/260/360a-360c to correct those salient anomalies 226 in an automated process, by software code 110/210, executed by hardware processor 104 of system 100, or by hardware processor 154 of user system 150. In other implementations, salient anomalies 226 may be flagged to user 144 for correcting salient anomaly 226. In those other implementations, software code 110/210, executed by hardware processor 104 of system 100, or executed by hardware processor 154 of user system 150, may receive corrections 148/248 from user 144. Moreover, in those implementations, software code 110/210, executed by hardware processor 104 of system 100, or executed by hardware processor 154 of user system 150, may apply corrections 148/248 to at least some of salient anomalies 226 in the segments of video included in image(s) 160/260/360a-360c, in response to receiving corrections 148/248 from user 144.

Thus, the present application discloses systems and methods for performing automated salience assessment of pixel anomalies that overcome the drawbacks and deficiencies in the conventional art. The automated solution for assessing salience of pixel anomalies disclosed in the present application improves on the state-of-the-art by enabling the efficient identification of innocuous anomalies that can be disregarded without substantially impacting the esthetics of an image or images including such innocuous anomalies. Consequently, the present solution advantageously renders pixel anomaly assessment and correction both more efficient and less costly than conventional approaches.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
    a computing platform including a hardware processor and a system memory storing a software code;
    the hardware processor configured to execute the software code to:
        detect a pixel anomaly in an image;
        obtain a salience criterion for the image;
        after detecting the pixel anomaly, classify the pixel anomaly as one of a salient anomaly or an innocuous anomaly based on the salience criterion for the image;
        disregard the pixel anomaly when the pixel anomaly is classified as the innocuous anomaly; and
        flag the pixel anomaly when the pixel anomaly is classified as the salient anomaly.

2. The system of claim 1, wherein flagging the pixel anomaly includes flagging the pixel anomaly to a user for correcting the pixel anomaly classified as the salient anomaly.

3. The system of claim 2, wherein the hardware processor is further configured to execute the software code to receive a correction to the image, from the user, for correcting the pixel anomaly classified as the salient anomaly.

4. The system of claim 3, wherein the hardware processor is further configured to execute the software code to apply the correction to the image.

5. The system of claim 2, wherein the hardware processor is further configured to execute the software code to apply a correction to the image, in response to flagging the pixel anomaly, to correct the pixel anomaly classified as the salient anomaly.

6. The system of claim 2, wherein the salience criterion for the image is obtained as an input from the user.

7. The system of claim 1, wherein the salience criterion for the image is a predetermined salience criterion.

8. The system of claim 1, wherein the image is a video frame, and wherein the salience criterion for the image is determined based on one of a shot of a video that includes the video frame or a scene of the video that includes the video frame.

9. A method for use by a system including a computing platform having a hardware processor and a system memory storing a software code, the method comprising:
    detecting, by the software code executed by the hardware processor, a pixel anomaly in an image;
    obtaining, by the software code executed by the hardware processor, a salience criterion for the image;
    after detecting the pixel anomaly, classifying, by the software code executed by the hardware processor, the pixel anomaly as one of a salient anomaly or an innocuous anomaly based on the salience criterion for the image;
    disregarding the pixel anomaly, by the software code executed by the hardware processor, when the pixel anomaly is classified as the innocuous anomaly; and
    flagging the pixel anomaly, by the software code executed by the hardware processor, when the pixel anomaly is classified as the salient anomaly.

10. The method of claim 9, wherein flagging the pixel anomaly includes flagging the pixel anomaly to a user for correcting the pixel anomaly classified as the salient anomaly.

11. The method of claim 10, further comprising:
receiving, by the software code executed by the hardware processor, a correction to the image, from the user, for correcting the pixel anomaly classified as the salient anomaly.

12. The method of claim 11, further comprising:
applying, by the software code executed by the hardware processor, the correction to the image.

13. The method of claim 10, further comprising:
applying, by the software code executed by the hardware processor, a correction to the image, by the software code executed by the hardware processor, in response to flagging the pixel anomaly, to correct the pixel anomaly classified as the salient anomaly.

14. The method of claim 10, wherein the salience criterion for the image is obtained as an input from the user.

15. The method of claim 9, wherein the salience criterion for the image is a predetermined salience criterion.

16. The method of claim 9, wherein the image is a video frame, and wherein the salience criterion for the image is determined based on one of a shot of a video that includes the video frame or a scene of the video that includes the video frame.

17. A method for use by a system including a computing platform having a hardware processor and a system memory storing a software code providing a graphical user interface (GUI), the method comprising:
detecting, by the software code executed by the hardware processor, a pixel anomaly in a first video segment of a plurality of video segments;
displaying, by the software code executed by the hardware processor, via the GUI, at least one video frame in the first video segment when analyzing the first video segment detects the pixel anomaly in the first video segment;
receiving, by the software code executed by the hardware processor, via the GUI, a salience criterion for the first video segment;
after detecting the pixel anomaly, classifying, by the software code executed by the hardware processor, the pixel anomaly as one of a salient anomaly or an innocuous anomaly based on the salience criterion received for the first video segment; and
disregarding the pixel anomaly, by the software code executed by the hardware processor, when the pixel anomaly is classified as the innocuous anomaly;
flagging the pixel anomaly, by the software code executed by the hardware processor, when the pixel anomaly is classified as the salient anomaly.

18. The method of claim 17, wherein flagging the pixel anomaly includes flagging the pixel anomaly to a user for correcting the pixel anomaly classified as the salient anomaly.

19. The method of claim 18, further comprising:
receiving, by the software code executed by the hardware processor, a correction to the first video segment, from the user, for correcting the pixel anomaly classified as the salient anomaly.

20. The method of claim 19, further comprising:
applying, by the software code executed by the hardware processor, the correction to the first video segment, by the software code executed by the hardware processor, in response to receiving the correction to the first video segment from the user.

* * * * *